United States Patent
Gluf, Jr.

(10) Patent No.: US 6,415,820 B1
(45) Date of Patent: Jul. 9, 2002

(54) VARIABLE ASSIST POWER STEERING SYSTEM AND FLOW CONTROL VALVE THEREFOR

(75) Inventor: Carl G. Gluf, Jr., Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/542,082

(22) Filed: Apr. 3, 2000

(51) Int. Cl.[7] ............................................... F16K 31/06
(52) U.S. Cl. ............... 137/625.65; 91/459; 251/129.07; 251/282
(58) Field of Search ....................... 91/459; 251/129.07, 251/282; 137/625.65

(56) References Cited

U.S. PATENT DOCUMENTS

| | | |
|---|---|---|
| 5,511,457 A | * 4/1996 | Hawkins et al. .......... 91/427 X |
| 5,607,137 A | 3/1997 | Kanda et al. |
| 5,918,635 A | 7/1999 | Wang et al. |

* cited by examiner

*Primary Examiner*—Kevin Lee
(74) *Attorney, Agent, or Firm*—Roger A. Johnston

(57) ABSTRACT

A solenoid operated valve with a single inlet for connection to a pump and a control signal outlet for connection to a power assist steering actuator and a bleed port for connection to a pressure control valve. The valve has a poppet rod extending through an annular valve seat, with a pressure equalization passage extending through the poppet and rod to balance the inlet pressure forces acting on the poppet and rod. The valve provides a low residual flow when the solenoid is de-energized and proportionally increases flow as current in the solenoid is increased and gives substantial linearity.

8 Claims, 4 Drawing Sheets

VARIABLE ASSIST POWER STEERING SYSTEM AND FLOW CONTROL VALVE THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to vehicle power assist steering systems and particularly to systems of the type providing a variable assist to the vehicle operator in response to changing conditions, as for example road speed. Such systems for providing variable steering effort assist in a vehicle have employed a solenoid operated flow control valve to control flow of hydraulic fluid to a power steering actuator, typically a hydraulic piston and cylinder type actuator. Presently, it is known to provide a solenoid operated flow control valve having a single inlet and two outlets with one outlet connected to the steering actuator and the other outlet connected to a pressure control valve or bleed valve for maintaining a controlled supply pressure to the power steering actuator wherein the flow through the pressure control valve is inversely proportioned to the solenoid energization current.

This arrangement has been necessitated in variable assist power steering systems because of the range of pressures experienced from the supply pump which has its speed varying with the engine shaft speed. In such a variable assist power steering system arrangement, the pressure control valve serves to bleed hydraulic fluid from the flow control valve to the inlet of the pump or sump when the pressure in the flow control valve valving chamber exceeds a preselected value thereby enabling the solenoid operated valve to control flow to the steering actuator at a generally controlled pressure.

Heretofore, solenoid operated valves for variable assist power steering assist systems have provided a flow response which is decreased with increasing current flow to the solenoid from a vehicle on-board electronic controller which received an input from a vehicle speed sensor. The electronic controller provided an electrical current to the solenoid for controlling flow to the steering actuator. However, at high current levels and low flow the position of the valve pintle close to the valve seat created a Bernoulli effect which permitted the pressure acting on the pintle head to drive the valve suddenly to a closed position maximizing the power assist to the steering and creating a sudden change in the steering response. In such an arrangement, where a failure occurs in the power supply to the solenoid during operation, a sudden decrease in steering effort required by the vehicle operator could result in the operator's over steering the vehicle and create a hazardous condition It is known to provide a solenoid pressure balanced spool valve for constant level assist power steering systems as described in U.S. Pat. 5,607,137. However, spool valves have a limited range of flow response and may not be suitable for variable assist power steering applications.

Accordingly, it has been desired to provide a solenoid operated proportional flow control valve for a hydraulic power steering system which gives the desired flow control, particularly at low current levels to the solenoid and which eliminates the effect of the pressure forces which tend to drive the valve to a suddenly closed position.

BRIEF SUMMARY OF THE INVENTION

It therefore has been desired to provide a solenoid operated flow control valve for a variable assist power steering system with flow to the steering actuator directly proportional to the solenoid current, yet prevent sudden valve closing and to provide a residual or minimum flow with the solenoid de-energized.

It is an object of the present invention to provide a flow control valve which provides flow from an inlet to a first outlet which is proportional to the energization current of the solenoid actuator of the valve and bleed flow to control pressure is provided at a second outlet.

It is another object of the invention to provide a solenoid operated flow control valve having the flow directly proportional to the solenoid energization current and to have the valve configured as a pintle-type valve to provide a relatively low manufacturing cost to render the valve suitable for high volume mass production vehicle variable assist power steering systems.

It is a further object of the present invention to provide a solenoid operated proportional flow control valve which is able to maintain a low or residual flow in the de-energized state to the first outlet without the pressure forces closing the valve.

The solenoid operated flow control valve of the present invention provides a poppet passing through the valve seat to the inlet side and having a reverse taper to provide directly proportional flow and a through passage in the poppet which communicates the inlet pressure with the opposite end of the poppet to balance the pressure forces acting on the poppet in the axial direction, thus eliminating the tendency of the pressure forces to abruptly close the valve at low flow positions of the poppet. The present invention provides calibration of the valve in the de-energized state to provide a residual low flow to the control signal port. The valve of the present invention is particularly suitable for variable assist power steering applications in motor vehicles.

DETAILED DESCRIPTION OF THE INVENTION

Figure 1:
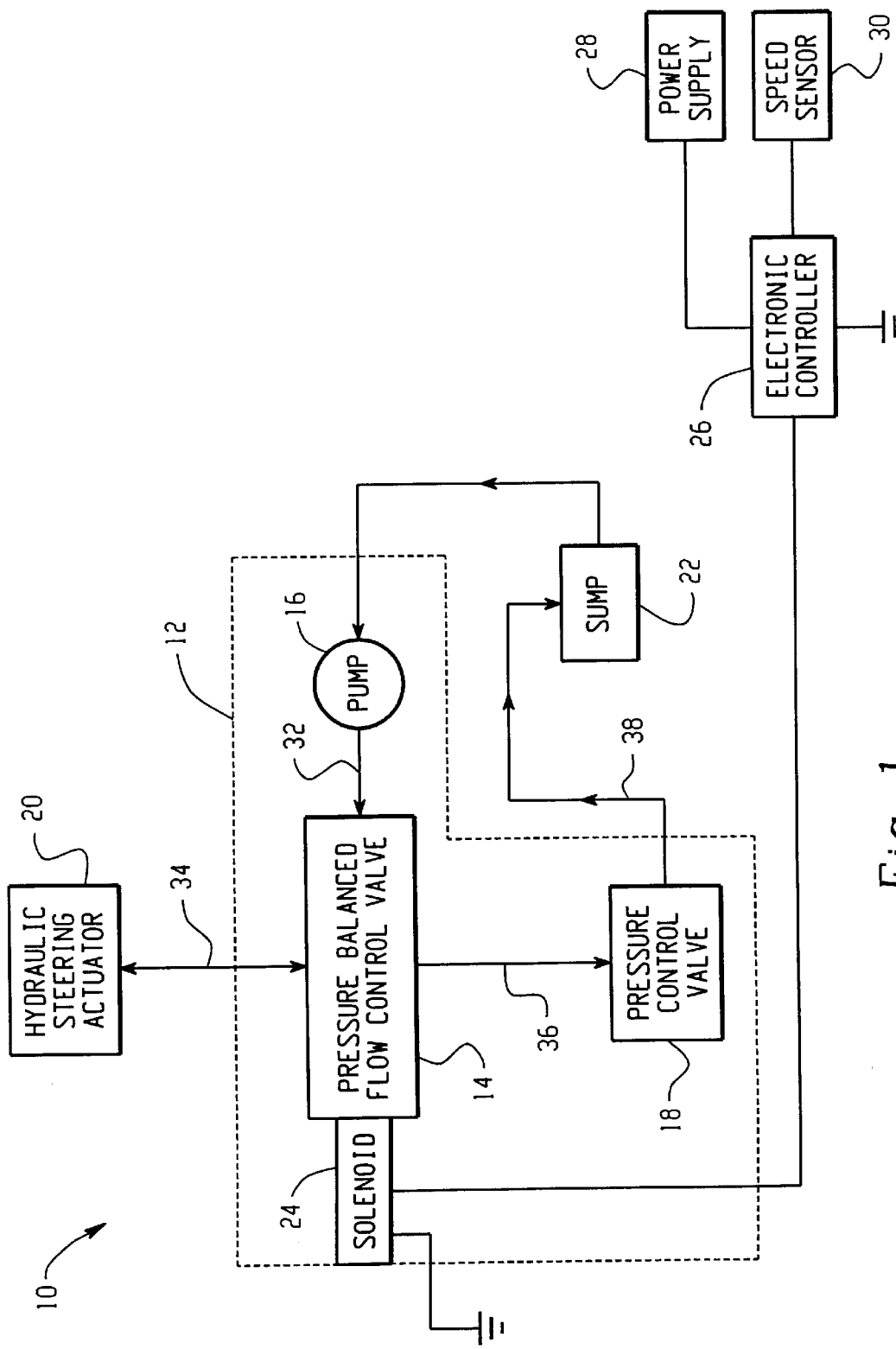
FIG. 1 is a block diagram of a variable assist power steering system employing the flow control valve of the present invention.

Referring to FIG. 1, a variable assist power steering system is indicated generally at 10 and includes a module 12 having mounted therein a pressure balance flow control valve in accordance with the invention indicated generally at 14, a pump 16 and a pressure control valve 18. The module 12 may be mounted in a convenient location on the vehicle adjacent the hydraulic steering actuator 20. A sump or pump return is denoted by reference numeral 22 which is illustrated as separate from module 12; however, it will be understood that alternatively the sump may be formed integrally with pump 16.

The pressure control valve 14 is operated by a solenoid indicated generally at 24 which receives energization current from an electronic controller 26 connected to the onboard vehicle power supply 28; and, controller 26 also receives an input from a vehicle road speed sensor 30. It will be understood that the hydraulic steering actuator 20 may comprise a piston and cylinder acting on the steering linkage or may comprise a pressure piston powered rack and pinion arrangement.

The system of FIG. 1 operates by flow control valve 14 receiving at its inlet pressurized fluid from the pump along conduit 32 and providing a controlled flow at its outlet along conduit 34 to the steering actuator 20. The pressure of the fluid in the valving chamber of valve 14 is controlled by bleeding fluid from the second outlet of the valve along conduit 36 through a pressure control valve which returns fluid along line 38 to the sump 22. It will be understood that the pressure control valve may be a simple pressure relief valve or an electrically controlled valve if desired.

Figure 2:
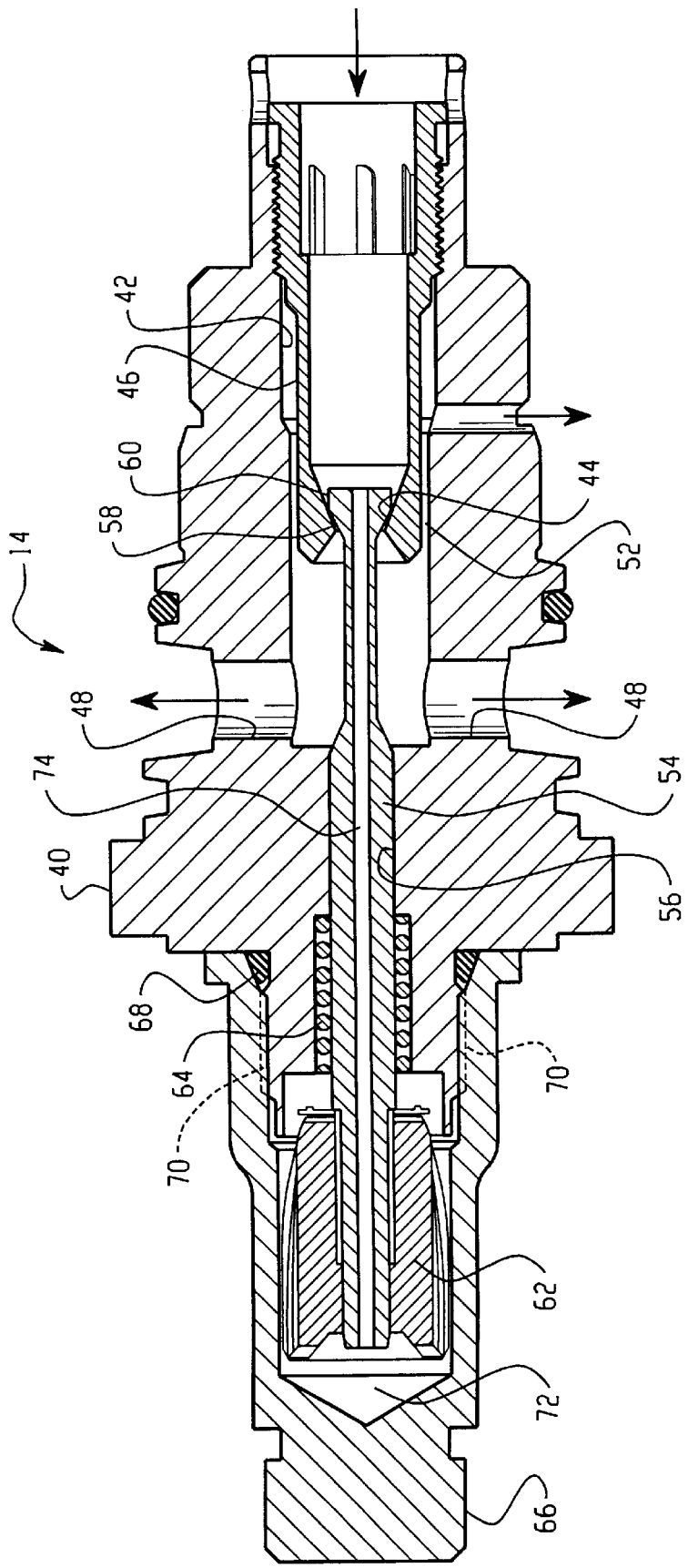
FIG. 2 is a cross-section of the valve of the present invention in the de-energized condition without the solenoid.
Figure 3:
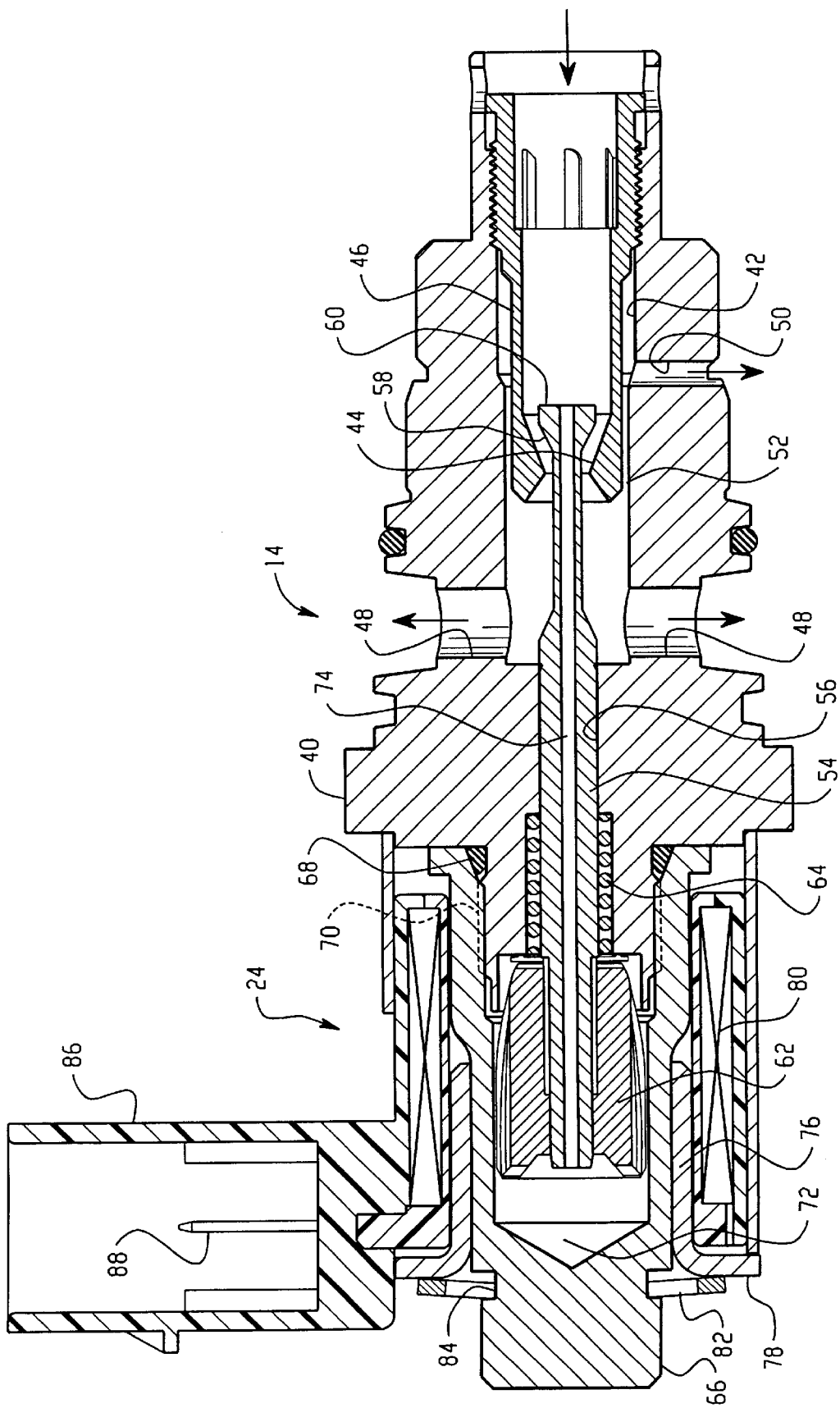
FIG. 3 is a cross-section of the valve of the present invention, with the solenoid fully energized; and, FIG. 4 is a graph of flow as a function of solenoid energization current for the valve of FIGS. 2 and 3.

Referring to FIGS. 2 and 3, the valve 14 is shown with the solenoid 24 fully energized with the valve in the fully open condition in FIG. 3; and, the valve 14 is shown in the low flow condition with the solenoid de-energized in FIG. 2.

The valve 14 has a valve body 40 which has an inlet passage 42 which has formed therein an annular valve seat 44 which may be formed on an insert 46 which has a plurality of passages 52 formed around the valve seat 44. It will be understood that the inlet passage 42 is adapted for connection to the inlet conduit 32 of the system of FIG. 1.

A primary outlet is formed in the passage 42 downstream of valving surface 44 and the outlet is denoted by a plurality of ports 48 which are adapted for connection to the conduit 34 supplying the steering actuator 20. A secondary or bleed outlet 50 is formed in the valve body 40 and spaced from the primary outlet 48; and, the secondary outlet 50 is adapted for connection to the conduit 36 supplying the inlet pressure control valve 18. The inlet passage 42 communicates with the primary control signal ports 48 via passages 52 provided in the form of grooves about the periphery of the insert 46 as denoted by reference numeral 52 in FIGS. 2 and 3.

A valve operating member 54 is slidably disposed in a bore 56 formed in valve body 40 and extends in one direction outwardly thereof in a direction opposite the inlet; and, valve operating member 54 extends in the opposite direction through valve seat 44 and has a tapered conical valving surface 58 formed on the undersurface of a poppet 60 formed on the end of the valve extending through the valve seat 44. Valve member 54 has an annular ferromagnetic armature 62 attached to the end of the valve member extending outwardly of the body 40; and, the armature and valve member 54 are biased in a leftward direction or in a direction tending to move the valving surface 58 toward the valve seat 44 to minimize flow by a spring 64 having one end registered against the armature and the opposite reaction end registering against the body 40.

An armature guide or cover denoted by reference numeral 66 having an enlarged diameter or bell-mouthed open end is received over the armature and sealed thereover by suitable seal ring 68. The armature guide 66 is secured to the body by threaded engagement as denoted by reference numeral 70 with a reduced diameter portion of the body. The interior of the armature guide chamber denoted by reference numeral 72 is communicated with the pressure in the inlet passage by means of a pressure equalization passage 74 which is formed through the valve member and is open at one end to chamber 72 and extends therethrough to poppet 60 and opens to the inlet passage 42.

Referring to FIG. 3, an annular flux collector 76 is received over the armature guide and has a flange 78 formed thereon which retains an encapsulated coil 80 over the armature guide. The flux collector and coil are secured thereon by a suitable snap ring 82 which engages a groove 84 formed in the armature guide. Encapsulated coil 80 has formed therewith an electrical receptacle 86 which has electrical terminal ends 88 formed therein which are connected to the coil 80 in an unshown manner well known in the art.

The construction of the valve shown in FIGS. 2 and 3 thus enables the coil at low current to overcome some of the bias of spring 64 and maintain the valve seat 44 open sufficiently to provide a minimal amount of flow through control port 48; and, in a power steering application, such as that of FIG. 1, to conduit 34 to the hydraulic steering actuator 20. With the coil de-energized the valve member 54 is moved to the position shown in FIG. 3 by spring 64 which does not completely close the valving surface 58 against seat 44 thereby permitting some flow to control signal ports 48. The valve is shown in the fully energized fully open position in FIG. 3 wherein maximum flow occurs through port 48 conduit 34 and to the steering actuator 20. Thus, in the event of loss of power to the coil 80, the valve member 54 is moved to the position shown in FIG. 2 and some minimal flow which in the application of FIG. 1 is to the steering actuator thereby maintaining a minimal power assist to the vehicle operator for steering. The present invention thus prevents a sudden change in steering assist in the event of power failure to the solenoid or failure of the solenoid to respond to energization.

Figure 4:
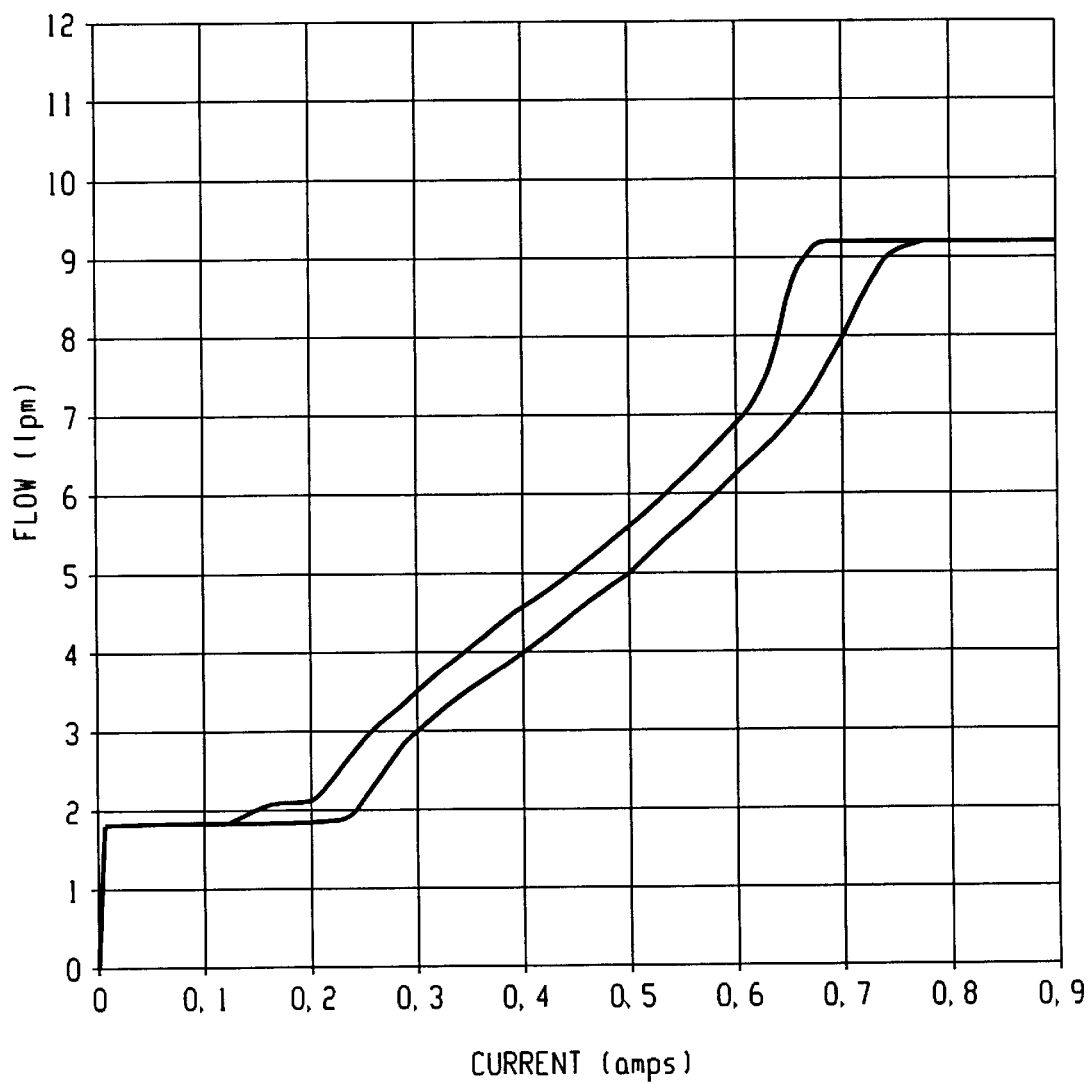

Referring to FIG. 4, a curve of the flow through a valve made in accordance with the present invention as a function of coil current is indicated showing that the response is substantially linear from low energization to full energization.

Although the invention has hereinabove been described with respect to the illustrated embodiments, it will be understood that the invention is capable of modification and variation and is limited only by the following claims.

What is claimed is:

1. A method of controlling hydraulic assist to a vehicle steering system comprising:

(a) disposing an electrically actuated flow control valve having an inlet and first and second outlet for receiving pressurized fluid at said inlet from a source of pressurized fluid;

(b) connecting an hydraulic steering actuator to receive fluid from said first outlet of the valve;

(c) connecting a pressure relief valve to the second outlet of the valve and connecting the pressure relief valve for returning fluid to the source;

(d) disposing an annular valve seat in said valve between the inlet and said first outlet;

(e) disposing an elongated valving member through said valve seat and forming an annular valving surface on said member and forming a pressure equalizing passage lengthwise through said member and equalizing the pressure on the ends of said member on opposite sides of said valve seat;

(f) electronically energizing said valve and moving said valving member and increasing flow over said valve seat proportionally with increasing energization; and, (g) biasing said valving member valving surface toward said annular valve seat when said valve is de-energized.

2. The method defined in claim 1, wherein said step of disposing an annular valve seat includes threading an insert in the inlet.

3. The method defined in claim 1, wherein said step of electrically energizing and moving includes connecting said valving member to an armature of a solenoid and electromagnetically moving the armature.

4. The method defined in claim 1, wherein said step of forming an annular valving surface includes forming an annular tapered seat having a reverse taper.

5. A method of controlling hydraulic assist to a vehicle steering system comprising:

(a) disposing an electrically actuated valve having an inlet and first and second outlet for receiving pressurized fluid at said inlet from a source of pressurized fluid;

(b) connecting an hydraulic steering actuator to receive fluid from said first outlet of the valve;

(c) connecting a pressure relief valve to the second outlet of the valve and connecting the pressure relief valve for returning fluid to the source;

(d) disposing a valve member in said valve and pressure balancing said valve member and biasing said valve member to a position of lowest flow when said valve is electrically de-energized;

(e) electrically energizing said valve and moving said valve member to a position increasing flow to said first outlet.

6. The method defined in claim 5, wherein said step of disposing a valve member includes forming a valving surface on said valve member and moving said valving surface with respect to a valve seat; and, said step of electrically energizing and moving includes moving said valve member and controlling flow to said first outlet proportional to said electrical energizing.

7. In a solenoid operated flow control valve for providing flow directly proportional to the solenoid current, the improvement comprising:

(a) a valve body defining an inlet port communicating with a signal outlet port through an annular valve seal and a pressure bleed outlet port communicating with said signal outlet port via a bleed passage;

(b) a valve operating member having a tapered valve seating surface extending through said valve seat with an armature provided on an end distal said valve seating surface;

(c) a pressure equalizing passage extending through said valve operating member from said valve seating surface to said armature and communicating the fluid pressure in said inlet port with said end distal said valve seating surface; and, (d) means for biasing said valve sealing surface toward said valve seat.

8. The improvement defined in claim 7, wherein said annular valve seat includes a conically tapered surface.

* * * * *